United States Patent
Alofs et al.

[19]

[11] Patent Number: 6,092,010
[45] Date of Patent: Jul. 18, 2000

[54] METHOD AND SYSTEM FOR DESCRIBING, GENERATING AND CHECKING NON-WIRE GUIDEPATHS FOR AUTOMATIC GUIDED VEHICLES

[75] Inventors: Cornell W. Alofs; Ronald R. Drenth, both of Petoskey, Mich.; Justin R. Drenth, Glen Burnie, Md.

[73] Assignee: Jervis B. Webb Company, Farmington Hills, Mich.

[21] Appl. No.: 08/922,752

[22] Filed: Sep. 3, 1997

[51] Int. Cl.[7] .................................................. G01C 22/00
[52] U.S. Cl. ................................ 701/23; 701/25; 701/26; 340/941; 180/167
[58] Field of Search .................................. 701/23, 24, 5, 701/26, 208, 117, 25; 180/167, 8, 168; 340/941

[56] References Cited

U.S. PATENT DOCUMENTS

| | | |
|---|---|---|
| 4,511,973 | 4/1985 | Miura et al. ............................ 701/208 |
| 4,860,209 | 8/1989 | Sugimoto et al. . |
| 4,935,871 | 6/1990 | Grohsmeyer . |
| 4,956,777 | 9/1990 | Cearley et al. . |
| 4,979,113 | 12/1990 | Roberts et al. . |
| 5,029,088 | 7/1991 | Minami . |
| 5,154,248 | 10/1992 | Schwager et al. . |
| 5,191,528 | 3/1993 | Yardley et al. . |
| 5,281,901 | 1/1994 | Yardley et al. . |
| 5,305,217 | 4/1994 | Nakamura et al. . |
| 5,367,456 | 11/1994 | Summerville et al. . |
| 5,467,084 | 11/1995 | Alofs et al. . |
| 5,650,703 | 7/1997 | Yardley et al. . |

FOREIGN PATENT DOCUMENTS

| | | |
|---|---|---|
| 0 236 614A | 9/1987 | European Pat. Off. . |
| 0 391 206A | 10/1990 | European Pat. Off. . |
| 0 403 390A | 12/1990 | European Pat. Off. . |
| 0 504 047A | 9/1992 | European Pat. Off. . |
| 2158965A | 11/1985 | United Kingdom . |

*Primary Examiner*—William A. Cuchlinksi, Jr.
*Assistant Examiner*—Yonel Beaulieu
*Attorney, Agent, or Firm*—Dickinson Wright PLLC

[57] ABSTRACT

A method and system for controlling the movement of one or more automatic guided vehicles includes a system controller, a number of non-wire automatic guided vehicles (AGV's) and location markers positioned on a floor. The system controller serves as a dispatcher and traffic controller for the system, providing, in one embodiment, two way wireless communication to each AGV in the system. Each AGV is equipped with a navigation and guidance system for controlling the AGV's movement along a predefined guidepath. Differential X, Y-coordinates from a path point database stored in the system controller are communicated to a given AGV which can then follow the predefined guidepath. Communicating just the differential X, Y-coordinates allows for improved control over systems utilizing a large number of AGV's.

26 Claims, 4 Drawing Sheets

METHOD AND SYSTEM FOR DESCRIBING, GENERATING AND CHECKING NON-WIRE GUIDEPATHS FOR AUTOMATIC GUIDED VEHICLES

FIELD OF THE INVENTION

The present invention is directed to a system and a method for controlling the movement of automatic guided vehicles and, in particular, to a system and method which uses a predefined non-wire guidepath based on a database of differential X,Y-coordinates to direct the automatic guided vehicle along the guidepath.

BACKGROUND ART

In the prior art, various systems and methods have been devised to control automatic or driverless vehicles. One system uses in-floor wire guidance to force an automatic guided vehicle (AGV) to follow one or more wires in the floor. This is accomplished by having each wire carry a small electric current of a different, but known, frequency. The wire(s), in turn, are installed and sealed in narrow, shallow slots cut in the floor. The cut slots, made up of arcs and straight line segments, are defined by the requirements of the system's desired guidepath(s). Typically, the various arcs and straight line segments are made tangential to each other in order to minimize the steering effort required to traverse a given path.

Tunable inductive sensors are then used to control the steering of each vehicle such that it will follow the radiated electromagnetic field of the desired wire (frequency). By using various frequencies to describe different sections of the guidepaths, the vehicle's route can be controlled by telling it which frequency to follow.

In order to know when to switch frequencies, the vehicle must also know where it is along the desired wire guidepath. Since the in-floor wire only provides the vehicle with lateral (steering) position information, position markers are used to update the vehicle's position along the wire guidepath. These position markers may be electromagnetic transponders, magnets, optic reflectors, etc. In any case, when a vehicle passes such a marker, it knows its exact location along the wire guidepath. These locations, in turn, can be used to enable or command the vehicle to switch frequencies, change speed/direction, stop, pickup, drop off, and/or perform one or more of many other possible commands. Typically, the particular operation(s) to be performed at each specific location, either immediately or delayed, would be described by an entry in an internal vehicle program (VP) database which, in turn, would be addressed, directly or indirectly, by the position marker itself.

Another system that employs AGVs is a non-wire control system. In these systems, instead of a wire placed in the floor, the AGV is directed along a virtual (logical) guidepath using reference markers for absolute position corrections and a vehicle controller that governs the movement of the AGV based on one or more inputs to the controller. These non-wire systems offer significant advantages over wire systems since no costs are incurred to lay wire in a floor.

U.S. Pat. Nos. 5,281,901 and 5,341,130 to Yardley et al. teach an automated guided vehicle control system which is downward compatible with existing guidewire systems providing both guidewire navigation and guidance and automatic navigation and guidance and wireless communication between a central controller and each vehicle. The non-wire guidance mode of Yardley, et al., comprises a series of reference markers positioned in a floor, a number of non-wire AGVs and an AGV central controller. The controller keeps track of the status and position of each AGV in the system using a map of the guidepath layout which is stored in its memory. The central controller provides two-way wireless communication to each AGV in the system. Each AGV is equipped with a non-wire navigation and guidance system for controlling the AGV's movement along a selected guidepath. Reference markers are positioned in the floor at various points along the guidepath. These reference markers provide absolute positions for correcting the AGV's current position.

Each AGV has an on-board controller which calculates a guidepath based on: the vehicle's current X,Y-coordinate and heading; and the exit X,Y-coordinate and exit bearing angle of the next desired guidepath segment. This path segment exit point positioning and exit bearing information is transmitted to the AGV from the central controller. The on-board computer first selects the type of guidepath calculation to perform based on the AGV's current heading angle with respect to the designated bearing at the exit of the path segment. Once the type of guidepath calculation is selected, the on-board computer calculates a guidepath based on the transmitted exit point positioning information and the AGV's current position, as determined from shaft encoders, the gyro, and reference markers.

Since AGV's do not usually follow the planned guidepath perfectly between path points or destinations, a new unique guidepath is calculated each time an AGV enters a new guidepath segment with different position and/or error values. The calculation parameters for calculating a guidepath for a path segment are that the initial angle of the guidepath must be tangent to the current direction of the AGV and the exit angle of the guidepath must be tangent to the exit bearing supplied by the central controller. These patents use a fifth order polynomial equation to calculate the guidepoints of the guidepath along which the AGV steers.

Upon receipt of a load movement task from a management computer, the central controller selects an AGV and schedules an optimum path for the selected AGV. Based upon the path scheduled and the current position of the AGV, the central controller provides path segment by path segment control using the calculated guidepoints through two-way communications between the central controller and the AGV. The length of each path segment ranges from a fraction of the length of an AGV to a length greater than the AGV length.

Control Engineering Company, a subsidiary of Jervis B. Webb Company of Farmington, Michigan, also has a non-wire AGV control system comprising a system computer, a series of reference markers positioned in a floor and a number of non-wire AGVs. The system computer serves as a dispatcher and traffic controller for the system and provides two-way wireless communication to each AGV in the system. The AGV's are equipped with a non-wire navigation and guidance system for controlling the AGVs along the defined guidepaths in the system. The reference markers are positioned in the floor at various points along the guidepaths and provide absolute position references for the AGVs.

Although the Control Engineering Company system is similar to traditional or wire-guided systems, the error correction routine in its guidance system differs in that the error correction is compared to guidepath information supplied by a computerized model of the guidepaths on-board the AGV rather than data returned from sensing a guidewire.

Each AGV's on-board controller contains a database that is used to simulate functions previously achieved by sensing the guidewire and position markers in a floor. The database includes details of the position of the location markers in the floor and absolute X,Y coordinates of the termination points for every path segment in the system. The database also includes function and location, in terms of distance traveled with respect to a path point, for each point in the system at which an AGV operation is to be performed. Typical functions include stopping, operating an on-board conveyor, resetting a release command, or the like.

The database is developed on a computer-aided design system with the guidepaths being designed so that each path segment in the system terminates tangentially with respect to an adjacent path segment. This restriction on the guidepath layout permits each path segment in the guidepath system to be characterized by absolute X,Y coordinates of its termination points and basic geometry. The X,Y coordinates for all the path segments in the system are stored in the database in each of the AGVs in the system.

In operation, the system computer transmits a final destination command and a route-release command to the AGV. The final destination command includes a vehicle identifier, a destination number, and an operation. The vehicle identifier contains the address of the specific vehicle the command is being issued to. The destination number is a number associated with a location in the system which may identify a conveyor, a queue, or a stop location. An operation designates an action to be performed by the vehicle such as a horn beeping or operation of an on-board conveyor or the like. The route release command is used to control the vehicle through path segments in the system. The route identifies a string of path-point labels which will define to the vehicle a portion of its desired path. When a route release is granted, the associated path points will extend the vehicle's current path toward its final destination or next hold stop position. As the AGV approaches the end of a route, the system controller will transmit another route-release command for the AGV. The AGV will acknowledge receipt of the command and proceed to negotiate this route. This process will continue until the AGV reaches its final destination which was transmitted as part of the destination command.

As described above, the route may comprise several path segments. The on-board computer of the AGV utilizes the absolute X,Y-coordinates retrieved from the database to regenerate the previously designed guidepath for each path segment. The AGV's guidance system will routinely check and correct the movement of the AGV so that it proceeds along the guidepath. The guidepaths for all path segments in the system are defined before the system is placed into operation. consequently, there is no selection of guidepaths made by the AGV's navigation and guidance system or a calculation of a guidepath based on an exit bearing from a path segment.

The non-wire systems described above are not without their disadvantages. The system described in the Yardley, et al., patents utilizes a complex 5th degree polynomial for describing a non-wire guidepath. In addition, since the Yardley, et al., system, when receiving exit-point positioning information, proceeds to select and calculate a guidepath based on the exit point's X,Y coordinates and exit bearing and the vehicle's actual position, the vehicle could calculate a "new path" into an obstacle provided its current position and/or orientation errors are great enough. Further, since this system uses not only X,Y coordinates but also exit bearings, much information must be transmitted from the central controller to the AGVs in order to direct their movement along a non-wire path. This information load can limit the number of vehicles controlled by a controller and may cause reliability problems and/or broadcast difficulties in the system.

Non-wire systems which have on-board controllers using absolute X,Y coordinates suffer from the need of requiring vast amounts of memory to accommodate the information required for the database. Again, since large amounts of information are required, transmitting this information from a remotely located controller causes the same problems as described above with the Yardley, et al., system.

In view of the drawbacks in the prior art non-wire systems, a need has developed to provide an improved system and method for controlling automatic guided vehicles. The present invention overcomes the disadvantages in the prior art noted above by providing a system and method for describing, generating, and checking non-wire guidepaths for automatic guided vehicles which simulates the simple arc and straight line features of an in-floor wired guidepath while also being compact enough to be held in a relatively small database either on the vehicle or on a common system controller remotely located from the vehicle.

SUMMARY OF THE INVENTION

Accordingly, it is a first object of the invention to provide an improved system and method for controlling automatic guided vehicles.

Another object of the present invention is a system and method for controlling automatic guided vehicles which simulates straight and arc line features of in-floor guidepaths using a compact database for on- or off-vehicle use.

Yet another object of the invention is a system and method which can interface guidepath description, generation and checking with any type of an automatic vehicle.

A still further object of the invention is the use of X,Y-coordinates based on differential measurements or calculations rather than absolute values to minimize the information needed for transmission to an AGV or to be stored in a database.

One other object of the invention is to provide a system and method which has the ability to easily and reliably check for guidepath deviation to meet safety, customer and industry standards.

Still another object of the invention is a system and method having multiple databases with the capability to use one or more of the databases either in an on-board or off-board application, thereby improving the flexibility of the system in terms of communication requirements and/or vehicle or database reprogramming.

Other objects and advantages of the present invention will become apparent as a description proceeds.

In satisfaction of the foregoing objects and advantages, the present invention provides improvements in systems and methods of non-wire guiding of automatic vehicles wherein the movement of at least one automatic guided vehicle is controlled along a guidepath comprising a plurality of path segments wherein each path segment comprises one of a linear shape or a curved shape with a beginning and an end point, each point being identified in terms of an X,Y-coordinate in a path point database, the movement controlled by a system controller utilizing the path point database and a navigation routine on the automatic guided vehicle. The inventive system and method utilizes a path point database with differential X,Y-coordinates, each differential X,Y-coordinate based on a difference between X and Y coordinates of a first path point and a second path point downstream of the first path point on the guidepath. Data relating to the differential X,Y-coordinates in the path point database is communicated to the at least one automatic guided vehicle to enable a navigational routine of the at least one automatic guided vehicle to direct the automatic guided vehicle to travel along each path segment.

The system and method also include a vehicle location database and a real position database. The vehicle location database contains a distance along a path segment and a location on the path segment corresponding to said distance, and instructions for the at least one automatic guided vehicle to perform an operation based on input from the vehicle location database. The real position database stores an actual X,Y coordinate of the at least one reference marker along a path segment. Deviation in travel of the at least one automatic guided vehicle based on the actual X,Y-coordinate and the vehicle location can then be corrected using the navigation system of the vehicle. With the error detection system and predefined guidepath in the path point database, any type of automatic vehicle can be controlled in a real world environment. Alternatively, transponders or the like could transmit to the vehicle its real location for error correction.

The databases can be on-board the vehicle or can be located at a remote site with two-way transmission and receiving capabilities for remote operation. Alternatively, only some of the databases can be remotely located or can be placed on board depending on the desired application of the automatic guided vehicles. The guidepath can be generated manually or by a computer aided drawing (CAD) system.

A preferred startup procedure includes providing at least two reference markers and guiding the at least one automatic guided vehicle past the at least two reference markers so that the at least one automatic guided vehicle senses actual X,Y-coordinates representing a path segment and a given location. With this information, the at least one automatic guided vehicle can receive data corresponding to other differential X,Y-coordinates to travel along subsequent path segments. The startup method can also include moving the vehicle to a known position and heading and then by defining that position and heading to the vehicle.

Any types of known reference markers and automatic vehicles can be used with the inventive system and method. Further, since the guidepath is precalculated, either manually or by CAD, the automatic guided vehicle does not calculate guidepaths as it travels.

BRIEF DESCRIPTION OF THE DRAWINGS

Reference is now made to the drawings of the invention wherein.

DESCRIPTION OF THE PREFERRED EMBODIMENTS

The present invention is an improvement over the Control Engineering Company method and system described above in terms of ease of transmitting information to automatic guided vehicles (AGVs). The inventive method and system simulates the simple arc and straight line features of a fixed, tangential, in-floor wired guidepath while also being compact enough to be held in a relatively small database, either on a vehicle(s) or as part of a common system controller for transmission to the vehicle(s).

It should be understood that the invention is adapted for any type of automatic vehicle, e.g., those using simple dead reckoning, inertial guidance, laser guidance or any other types known or contemplated. Since these navigational systems and the routines they employ are well known in the art, a detailed description thereof is not deemed necessary for understanding of the invention.

The following provides a description of a method and system which can convert the guidance and position information normally provided by in-floor wired guidepaths and position transponders/magnets into database forms that can be used for guiding non-wire AGVs. The description details a method of using a path point (PP) database, a vehicle location (VL) database and a real position (RP) database. The "to" point corresponds to the endpoint of a segment, the "from" point corresponds to the startpoint of a segment. The PP database includes differential X,Y-coordinates representing "to" and "from" points of a path segment, whether it is a line or an arc segment. The PP and VL databases can be used with the VP database as described above to fully describe and control an ideal non-wire system. To fully control a real world or non-ideal non-wire system, the RP database containing data for correcting navigational errors associated with measurements and/or physical changes, such as tire wear, vehicle loading or the like should be used. The methods and systems described below are one preferred way of accomplishing the objects of the invention. Other ways employing the inventive concepts described herein as would be within the skill of the artisan can be used as well.

The PP database is addressed by assigning an arbitrary number, i.e., label, to each path point used in the system. Although each label number may be totally random, they should be unique, preferably sequential, and within some practical numerical limits in order to minimize the size of any particular PP database.

Figure 1:
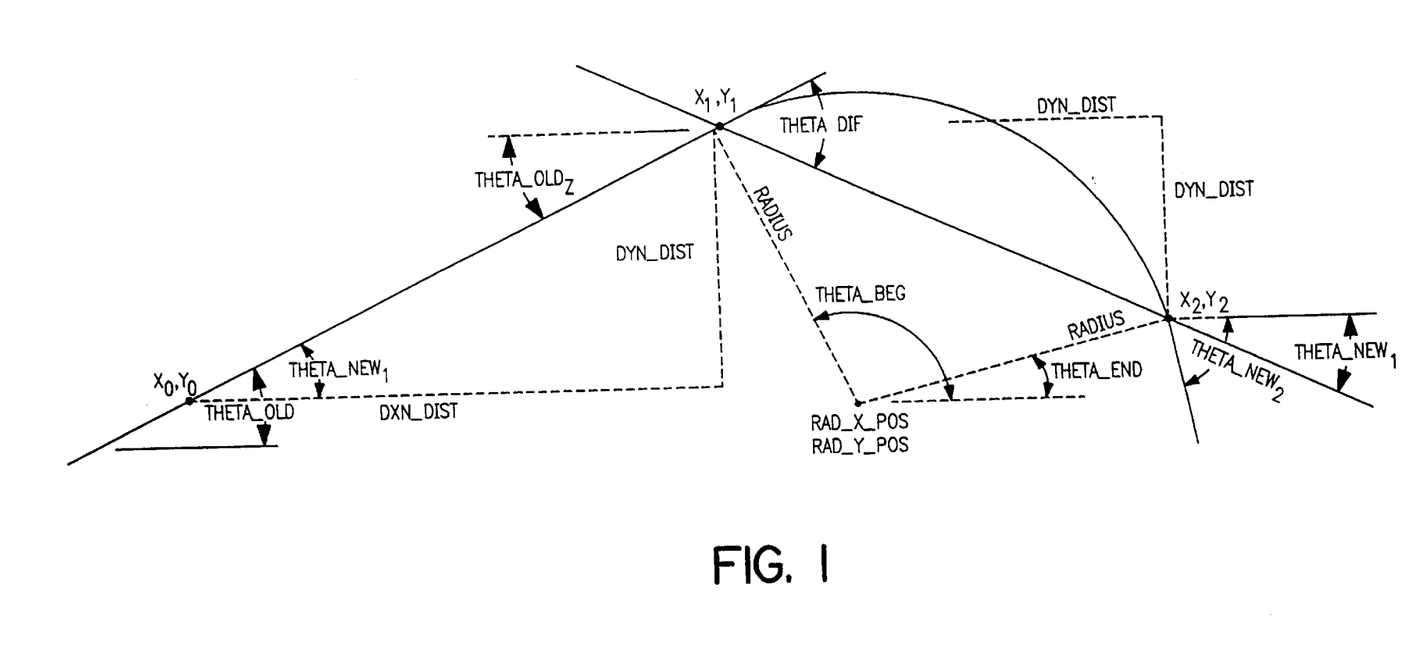
FIG. 1 is a graph illustrating geometry defining path and subsequent path segments.

The PP database contains the system X,Y coordinates of the endpoints of each line and/or arc segment(s) that make up the desired quidepath. Since, by an additional system definition, the guidepath always begins with a line segment and its "from" and to" endpoints, each following segment, either a line or an arc, is fully defined by its final, i.e., "to", endpoint's X,Y coordinates only, i.e., no heading and/or bearing angles are required. Referring to FIG. 1, this can be proven as follows:

Given a new path point label and its X,Y coordinates (X_Pos_New and Y_Pos_New), i.e., $X_1,Y_1$ or $X_2,Y_2$, determine if the new path segment is a LINE or an ARC relative to the last path point label and its X,Y coordinates (X_Pos_Old and Y_Pos_Old), i.e., $X_0,Y_0$ or $X_1,Y_1$. Also known at this time is the last path segment's "Exit Angle" (Theta_Old)

It should be noted that the initial Theta_Old angle comes from the original "insertion" line path segment's "from" and "to" points and is calculated as follows:

Theta_Old=ARCTAN (To_y−From_y)/(To_X−From_X)

Based on the new path segment's "Entry Angle" (Theta_New) and the last path segment's "Exit Angle", it can be determined if they are equal or are within some reasonable tolerance of being equal. For example, a tolerance of ±1.4 degrees (360°/256) can be used because the check then turns out to be a simple test of the two angle's most significant bytes, i.e., one revolution (360°) divided by $2^8$ (256)). If the two angles match within the given tolerance, it can be assumed that the new path segment is a line and that the vehicle will immediately head towards the new path point.

If the two angles do not match within the given tolerance range, it can be assumed that the new angle points down the "cord" of the desired arc segment. The difference (Theta_Dif) between the last path segment's exit angle and the angle of the arc's cord can then be found. The difference is doubled and added to the last path segment's exit angle. This new heading then is defined to be the new arc segment's exit angle (Theta_New).

The calculations to determine the new segment type are as follows:

DXN_Dist=X_Pos_New−X_Pos_Old (=Delta X New Distance)

DYN_Dist=Y_Pos_New−Y_Pos_Old (=Delta Y New Distance)

In some cases, the DXN_Dist and DYN_Dist values may be given or (transmitted) instead of the full new X,Y positions in order to save transmission time and/or storage space. Since typical "delta distances" between adjacent path points would not have to cover the entire range of the system, a smaller (faster) number system may be used. For instance, a plus/minus 170 foot path segment can be covered by a 16-bit binary word (two bytes) to a resolution of 1/16th of an inch, while a 24-bit value (three bytes) would be required to cover both the absolute X and Y values of a typical system with the same resolution.

Continuing to determine whether the next path segment is a line or an arc, the calculations wherein "Tol" represents the tolerance as described above are as follows:

Theta_Old = the last path segment's "exit angle"
Theta_New = ARCTAN (DYN_Dist/DXN_Dist)
If (Theta_Old −Tol) <= Theta_New <= (Theta_Old +Tol)

then, the new segment represents a line.

If the condition described above is not met, than the new path segment is an arc.

A typical path point database might be stored as follows:

| Label n−1: | X coordinate of path point n−1 |
| | Y coordinate of path point n−1 |
| Label n: | X coordinate of path point n |
| | Y coordinate of path point n |
| Label n+1: | X coordinate of path point n+1 |
| | Y coordinate of path point n+1 |

The VL database contains the distance down a path segment where a desired operation is to take place, i.e., this database supplies the information that the "position markers" supplied to the in-floor wired system as described above. Each entry in the VL database contains the "from" and "to" labels of the path segment, the distance down the path segment from the "from" point to the desired "location" point as well as the "location" number. The location number, in turn, is used as the address of the VP database entry which contains the operation to be performed. Again, although each location number can be totally random, they should be preferably sequential and within some practical limit in order to minimize the size of any particular VP database. Likewise, any duplication of common features such as particular speed requests, horn on/off, directional lights on/off, etc., should all share a common "location" number.

A typical VL database might be stored as follows:

| "From" Label: | "To" path point label |
| | Distance down path segment |
| | Location number |
| | "To" path point label |
| | Distance down path segment |
| | Location number |
| "From" Label:. | "To" path point label |
| | Distance down path segment |
| | Location number |
| | "To" path point label |
| | Distance down path segment |
| | Location number |

An entry of the VL database would be selected by monitoring the data feedback from the navigation routine which would continually supply the current distance down the active path segment along with the "from" and "to" labels of the active segment. As soon as the "from" and "to" labels matched and the current and desired distances matched within some predefined tolerance, the given location number would be used as an index into the VP database. The appropriate VP database entry would then be used to define the requested action as if a "position marker" were read in an in-floor wired system.

As mentioned above, the "Real Position" (RP) database would contain data for correcting the inevitable navigational errors that will occur in any real situation. Typically such a database would contain the real physical X,Y system coordinates of the update reference markers used for correcting the vehicle's position, i.e., magnets, transponders, reflectors, etc. When using identical reference markers such as magnets or reflectors, the database would be indirectly indexed, i.e., according to the vehicle's present estimated location and the occurrence of a reference marker. In the case of uniquely labeled transponders, however, the RP database can be directly indexed by the marker's received code. Alternately, the RP database could be completely removed if the transponders were programmed to transmit to the vehicle its real X,Y location directly.

Given the method, algorithms, and database descriptions as explained above, a typical non-wire system would be designed as follows. A guidepath would be designed which would meet the desired routing and throughput requirements of the assigned job. Since this is a task most easily handled by a computer drafting package it only makes sense that this phase of the design is handled using one of the many commercial drafting software packages. This is especially true when one considers the ease with which such packages allow one to expand and/or modify existing designs.

There is, however, one more large advantage in using the right commercial drafting software package for designing the non-wire guidepath. Some software packages, such as AutoDesk's AutoCAD, allow integration of third party software with full access to the active drawing's internal database. Such third party software can add automatic file checking (such as making sure all line and/or arc segments are tangent, checking for maximum distances and/or angles, etc.) and automatic PP, VL, VP, and, if required, RP database file generation from the drawing's information and/or additional pop-up screen menus.

Given the completed database files as generated above, a typical non-wire system would operate as follows. First the vehicles must be introduced into the system. This could be done a number of ways, one of which would be to move the vehicle to a known position and heading and then to enter that fact into the system via either real coordinates and angles or a position code which represents the known real data. The preferred method is to manually guide each vehicle over two position transponders. The data received by reading the X,Y positions of two transponders "inserts" the vehicle into the system by providing enough information so the vehicle can determine its own position, heading and, indirectly, its current "Vehicle Location Number".

Once the required vehicles have been inserted into the system, they will receive additional quidepath points as they are requested to travel. As each additional path point is received, the vehicle will check it out to see if it is a line or an arc as explained above.

As each new path point is received and checked in, the "ARC_SEG" bit is set to represent an "Arc Segment" and reset to represent a "Line Segment". Additional information must then be regenerated and saved on behalf of each type of segment as follows (this data will be used by the vehicle's navigation routine):

IF "Line_Seg" THEN NEED TO CALCULATE AND SAVE THE FOLLOWING:

---

SEG_TOTAL = SQUARE ROOT (DXN_Dist$^2$ + DYN_Dist$^2$)
FINAL_VEL = Max_Velocity (forced to number system maximum)
SIN_T_NEW = SIN (Theta_New)
COS_T_NEW = COS (Theta_New)
(Theta_New is available from above)

---

IF "Arc_Seg" THEN NEED TO CALCULATE AND SAVE THE POLLOWING:

---

Theta_Dif = Theta_New − Theta_old
THETA_NEW = Theta_Old + (2 * Theta_Dif)
ARC-SIGN = +1, IF Theta_Dif is positive
   or  = −1, IF Theta_Dit is negative
SIN_T_NEW = SIN (Theta_New)
COS_T_NEW = COS (Theta_New)
RADIUS  = | (X_Pos_Old − X_Pos_New) | /
          | [SIN(Theta_Old) − SIN(Theta_New)] |
  or  = | (Y_Pos_Old − Y_Pos_New) | /
         | [COS (Theta_Old) − COS (Theta_New) } /
RAD_X_POS = X_Pos_New − Arc_Sign*Radius*SIN (Theta_New)
RAD_Y_POS = Y_Pos_New + Arc_Sign*Radius*COS (Theta_New)
THETA_BEG = Theta_Old − Arc-_Sign*90
SEG_TOTAL = π*Radius*Arc_Sign*(Theta_New − Theta_Old)/180

---

Finally, find the maximum velocity allowed for this "ARC" path segment (which is dependent on the radius of the arc and the vehicle's programmable maximum turning acceleration/deceleration value, Turn_AccDec):

FINAL_VEL=SQUARE ROOT (Turn_AccDec*Radius)

It should be noted that the Final_Vel calculated above (for both the line and the arc segments) is stored as the final velocity of the previous segment while the Final_Vel of the new segment is set to zero. This will serve as the new segment's maximum entrance velocity as it will be handled as the final, or exit velocity of the previous segment. Likewise, an ideal vehicle will always watch for the end of the currently defined path in order to decelerate and stop before the "end of path". Under these conditions, a vehicle will always come to a complete stop at the end of the currently defined path. This feature guarantees that the vehicle will not lose guidance or overrun its granted guide-path when all the path points of the "released route" have been consumed.

Once the next path segment, as represented by the new path point, has been checked in, the following data is then available for the navigation routine: Seg_Total, Theta_New, Final_Vel, Sin_T_New, Cos_T_New as well as Radius_X_Position, Radius_Y_Position, Theta_Beg, Arc-Sign, and Radius if the next segment is an arc.

If a multiple path point First-In-First-out (FIFO) buffer is provided (the preferred situation in order to provide smooth and continuous segment to segment travel operations), each segment's checked in data should remain with the path point's X,Y location and label data until required by the navigation routine. As each path segment is consumed, i.e., the segment's total distance traveled value "Seg_Total" is exceeded, the buffer is popped by one set of data making the next segment automatically active.

Provided a standard "current position and heading" routine is tracking the vehicle's real progress, via shaft encoders and/or a gyro, the vehicle's lateral offset and heading errors can be calculated from the ideal path as follows:

Given "Theta_New" (the final heading of the current path segment), and its sine and cosine values, the current path segment's total distance (Seg_Total) and the vehicle's current location (Cur_X_Pos, Cur_Y_Pos) and heading (Cur_Heading), the vehicle's current lateral offset (Offset_Err) and heading (Theta_Err) errors can be calculated. Also, the distance traveled (Cur_Distance) and the distance remaining (Rem_Distance) for the current line or arc path segment can be determined.

Figure 2:
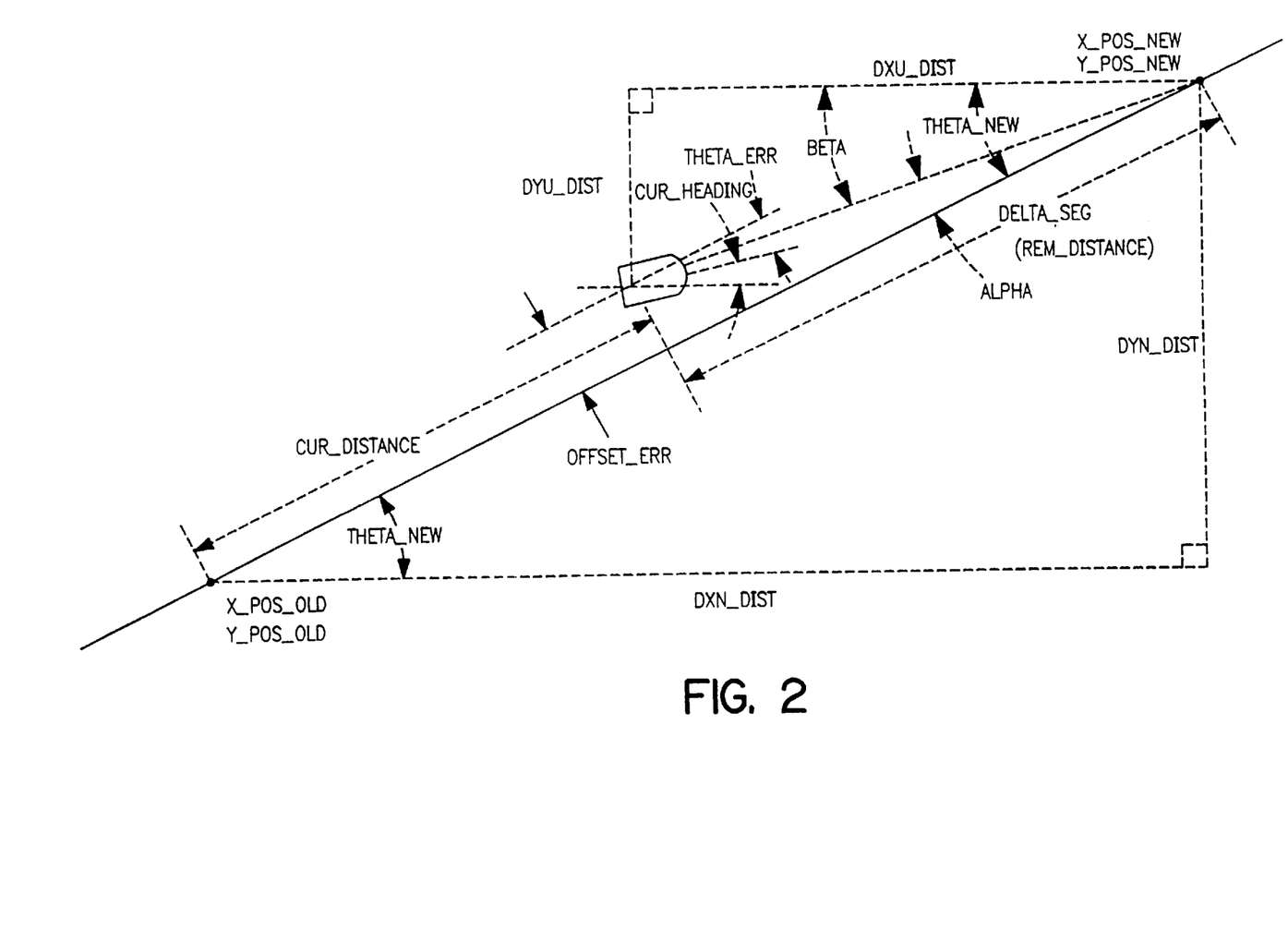
FIG. 2 is a graph illustrating lateral offset and heading error geometry for a straight line segment.

LINE SEGMENT NAVIGATION Solution
(refer to FIG. 2):

---

DXV_Dist       = X_Pos_New − Cur_X_Pos
DYV_Dist       = Y_Pos_New − Cur_Y_Pos
Delta_seg      = DXV_Dist*COS(Theta_New) + DYV_Dist*SIN(Theta_New)
OFFSET_ERR  = DYV_Dist*COS(Theta_New) − DXV_Dist*SIN(Theta_New)
THETA_ERR    = Theta New − Cur Heading
CUR-DISTANCE = Seg_Total − Delta_Seg
REM_DISTANCE = Delta_Seg;

---

The segment is assumed to have been consumed when the remaining distance is zero or negative. Then, set the Seg_Done flag when the Rem_Distance<=Zero.

Figure 3:
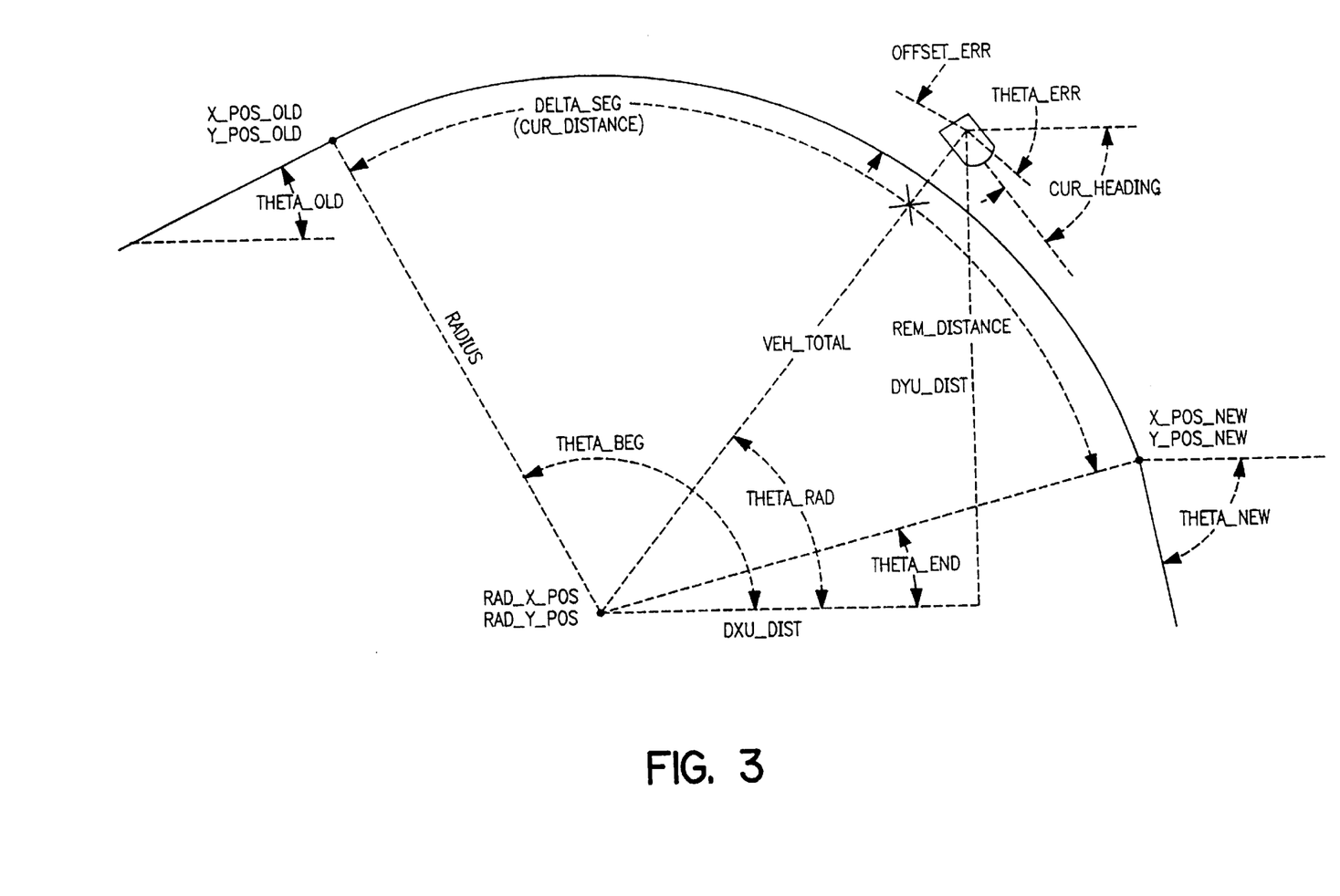
FIG. 3 is a graph illustrating lateral offset and heading error geometry for an arc segment.

ARC SEGMENT NAVIGATION Solution
(refer to FIG. 3):

For the arc segment calculation, it should be noted that Theta_Beg, Arc_Sign, Seg_Total, Radius and the arc's center point, i.e., (Rad_X_Pos, Rad_Y_Pos) are also given (regenerated by the "Check In" routine as explained above).

---

DXV_Dist     = Cur_X_Pos − Rad_X_Pos
DYV_Dist     = Cur_Y_Pos − Rad_Y_Pos
Veh_Total    = SQUARE ROOT (DXV Dist$^2$ + DYV_Dist$^2$)
OFFSET-ERR  = Arc_Sign*(Veh_Total − Radius)
Theta_Rad = ARCTAN (DYV_Dist/DXV_Dist)
THETA_ERR   = Theta_Rad + (90°*Arc_Sign) − Cur_Heading
Delta-Seg     = π*Radius*Arc_Sign*(Theta_Rad − Theta_Beg)/180

-continued

```
CUR_DISTANCE = Delta_Seg
REM_DISTANCE = Seg_Total - Delta_Seg;
```

The segment is assumed to have been consumed when the remaining distance is zero or negative: Then the Seg_Done flag is set when Rem_Distance<=Zero.

For the signs of CUR_DISTANCE and REM_DISTANCE to work out correctly for sensing a distance over run of an "Arc Segment", the arc segment algorithm, presented above, requires that all arc segments be less than plus or minus 360 degrees (i.e., the presently defined, continuous 360° heading has no signed limits).

Given the vehicle's current offset and heading errors, appropriate standard steering algorithms can be used to generate steering correction command(s) in order to, once again, minimize both the lateral offset and/or heading errors. Such steering algorithms are available for any type of vehicle wheelbase/footprint that may be required. A generic algorithm is also known that covers all types of vehicle footprints as well as allows for vehicle crabbing travel and/or fixed heading motions.

Figure 4:
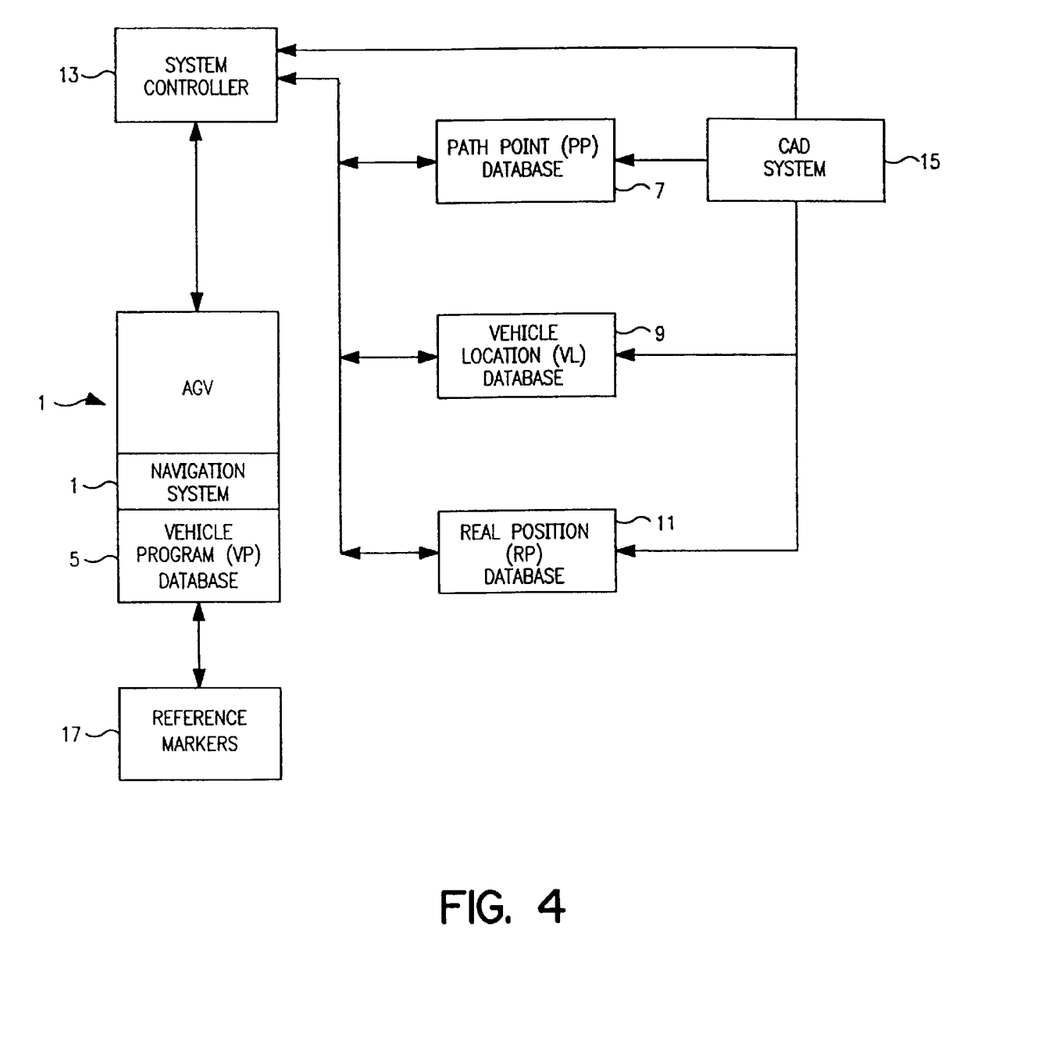
FIG. 4 is a schematic diagram of an exemplary system of the invention.

FIG. 4 shows an exemplary system using the PP, VL, and RP databases in a remote location from the AGV. More specifically, the system identified in FIG. 4 is shown with a single AGV 1, but a plurality of vehicles can be used. In the FIG. 4 embodiment, the AGV 1 is shown with the navigation system 3 and the vehicle program database 5 on board. As explained above, the vehicle program database can also be located remotely, thereby using wireless communication. The system also shows the path point database 7, the vehicle location database 9 and the real position database 11 located remotely from the AGV. The three databases, 7, 9, and 11, are in communication with the system controller 13, located remote from the AGV. The system controller 13 has two-way communication with the AGV. FIG. 4 also shows that a CAD system 15 can be used to generate the path point database 7, the vehicle location database 9, the vehicle program database 5 and the real position database 11. Again, the embodiment depicted in FIG. 4 can be altered by changing the locations of the various databases so that one, some, or all are on board the AGV or remotely located therefrom. Finally, the reference markers used for error correction are identified by reference numeral 17 and communicate with the AGV 1.

The inventive method and system for controlling AGVs offers significant advantages over prior art systems. First, with the use of differential X,Y-coordinates, much less memory is required either in an on-board database or a remote database to assist in directing the AGV on its intended path. This advantage is particularly important when transmitting data since less data to be transmitted allows for control of more AGVs and better system reliability. The invention also does not require heading or bearing information to be inputted or transmitted to the AGV, thereby simplifying the overall control process.

Combining the predefined guidepath system and an error correction system permits the use of any type of automatic vehicle to be employed. Further, increased flexibility is attained since the various databases can be located in remote or on-board sites depending on an intended use of the AGVs. If manual operation is intended, the databases and controller can be located on the AGV so that an operator at a particular station could command the vehicle to travel to the next desired station by entering a command to release the required guidepath points.

All databases could be located in a remote system controller with the controller releasing new guidepath points as required. With this arrangement, maximum flexibility is provided since reprogramming can be done for one controller rather than a database in each vehicle.

In another alternative, the database containing the path points for the guidepath could be stored remotely with the remaining databases located on-board the vehicle. High guidepath flexibility with minimum communication requirements are achieved along without having to reprogram the vehicle when the guidepaths are altered with this embodiment.

By using a CAD system for generation of the guidepaths, the guidepath drawings can be checked using straightforward, definable rules without requiring a real system and/or vehicle(s). Once a valid path has been designed, the required databases can be generated directly from the checked drawings. The guidepath description method and control schemes lend themselves to reliable "guide-safe" checking. For example, ANSI specifications require non-wire vehicles to "E-stop" if they travel outside of a ± six inch window around a "desired" path. This condition is easy to check by monitoring the absolute value of the OFFSET_ERR value for being greater than six inches and by making sure that both the CUR_DISTANCE and REM_DISTANCE values remain larger than negative six inches.

Accordingly, an invention has been disclosed in terms of preferred embodiments thereof which fulfill each and every one of the objects of the present invention as set forth above and provides a new and improved method and system of controlling automatic guided vehicles.

Various changes, modifications and alterations from the teachings of the present invention may be contemplated by those skilled in the art without departing from the intended spirit and scope thereof. Accordingly, it is intended that the present invention only be limited by the terms of the appended claims.

The invention claimed is:

1. A method of controlling the movement of at least one automatic guided vehicle along a guidepath comprising:
    a) defining a guidepath for the automatic guided vehicle to travel along, the guidepath comprising a plurality of path segments wherein each path segment comprises one of a linear shape or an arc segment each with a beginning and an end point;
    b) identify each of the beginning and end points in terms of an X,Y-coordinate in a path point database;
    c) providing a system controller utilizing the database, a plurality of reference markers having reference X-Y coordinates and being positioned along the guidepath, and a navigational routine on the automatic guided vehicle;
    d) further providing the path point database with differential X,Y-coordinates, each differential X,Y-coordinate based on a difference between X and Y coordinates of a first path point and a second path point downstream of the first path point on the guidepath;
    e) communicating data to the at least one automatic guided vehicle relating to the differential X,Y-coordinates in the path point database; and
    f) utilizing the system controller and the navigational routine of the at least one automatic guided vehicle along with the data relating to the differential X Y-coordinates to direct the at least one automatic guided vehicle to travel along one of the linear shape or the arc segment of each path segment.

2. The method of claim 1, further comprising the step of providing a vehicle location database which contains a distance along a path segment and a location on the path segment corresponding to said distance, and instructing the at least one automatic guided vehicle to perform an operation based on input from the vehicle location database.

3. The method of claim 1, further comprising the steps of:
c) providing a real position database including the reference X,Y-coordinates of the plurality of reference markers;
d) providing information related to a location of the at least one automatic guided vehicle along the guidepath; and
e) correcting for any deviation in travel of the at least one automatic guided vehicle off the guidepath based on the information and the real position database.

4. The method of claim 3, further comprising the step of providing a vehicle location database which contains a distance along a path segment and a location on the path segment corresponding to said distance, and instructing the at least one automatic guided vehicle to perform an operation based on input from the vehicle location database.

5. The method of claim 1, wherein the guidepath is generated using one of a computer aided drawing system and manual means.

6. The method of claim 5, wherein the computer aided drawing system allows integration with third party software.

7. The method of claim 1, further comprising the steps of:
c) guiding the at least one automatic guided vehicle past at least two of the plurality of reference markers so that the at least one automatic guided vehicle senses the reference X,Y-coordinates of the at least two reference markers representing a path segment and a given location to facilitate receipt of data corresponding to other differential X,Y-coordinates along other path segments.

8. The method of claim 1, further comprising the steps of moving the automatic guided vehicle to a known position and heading and entering into the database the known position and heading via real coordinates or a position code representing the known position and heading.

9. The method of claim 1, wherein the reference markers are transponders.

10. The method of claim 1, wherein the guidepath is predefined and the at least one automatic guided vehicle is directed along each path segment without calculating a new guidepath for each path segment.

11. The method of claim 2, wherein the vehicle location database is remotely located from the at least one automatic guided vehicle.

12. The method of claim 3, wherein the real position database is remotely located from the at least one automatic guided vehicle.

13. The method of claim 1, wherein the path point database is remotely located from the at least one automatic guided vehicle and the differential X,Y-coordinate is transmitted to the at least one automatic guided vehicle.

14. The method of claim 4, wherein at least one of the path point database, the vehicle location database and the real position database is located remotely from the automatic guided vehicle.

15. The method of claim 14, wherein all of the databases are located remotely from or are on board the at least one automatic guided vehicle.

16. The method of claim 1, comprising issuing a route release command to the at least one automatic guided vehicle when the automatic guided vehicle reaches an and point of one of the path segments and utilizing the X,Y-differential coordinates of the end point of the next one of the path segment for guiding the automatic guided vehicle along the next path segment.

17. A system for controlling the movement of at least one automatic guided vehicle along a guidepath defining a path for the automatic guided vehicle to travel along, comprising a plurality of path segments as a guidepath wherein each path segment comprises one of a linear shape or an arc segment with a beginning and an end point, each beginning and end point being identified by an X,Y-coordinate in a path point database, a system controller utilizing the path point database, a plurality of reference markers having reference X,Y-coordinates and being positioned along the guidepath, and a navigation system on the least one automatic guided vehicle for controlling the movement of the at least one automatic guided vehicle, the system further comprising:
a) a means for storing the path point database with differential X,Y-coordinates, each differential X,Y-coordinate based on a difference between X and Y coordinates of a first path point and a second path point downstream of the first path point on the guidepath; and
b) means to communicate differential X,Y-coordinates to the at least one automatic guided vehicle so that the at least one automatic guided vehicle can follow the guidepath using the differential X Y-coordinates.

18. The system of claim 17, further comprising means for storing a vehicle location database which contains a distance along a path segment and a location on the path segment corresponding to said distance so that the at least one automatic guided vehicle performs an operation based on input from the vehicle location database.

19. The system of claim 17, further comprising means for storing a real position database including the reference X,Y-coordinates of the plurality of reference markers so that any deviation in travel of the at least one automatic guided vehicle can be corrected.

20. The system of claim 19, further comprising means for storing a vehicle location database which contains a distance along a path segment and a location on the path segment corresponding to said distance so that the at least one automatic guided vehicle performs an operation based on input from the vehicle location database.

21. The system of claim 17, wherein the storing path point database means is remotely located from or on-board the at least one automatic guided vehicle.

22. The system of claim 20, wherein at least one of the path point database, the vehicle location and the real position database storing means is remotely located from the at least one automatic guided vehicle.

23. The system of claim 21, wherein the storing means is remotely located from the at least one automatic guided vehicle.

24. The system of claim 17, further comprising a computer aided drawing system for generating the guidepath for storing in the path point database.

25. The system of claim 20, further comprising a computer aided drawing system for generating any combination, or all, of the path point, real position and vehicle location databases.

26. The system of claim 17, further comprising means for issuing a route release command to the at least one automatic guided vehicle when the automatic guided vehicle reaches an end point of one of the path segments and utilizing the X,Y-differential coordinates of the end point of the next one of the path segment for guiding the automatic guided vehicle along the next path segment.

* * * * *